(12) United States Patent
Izhak-Ratzin et al.

(10) Patent No.: US 9,882,832 B2
(45) Date of Patent: Jan. 30, 2018

(54) FINE-GRAINED QUALITY OF SERVICE IN DATACENTERS THROUGH END-HOST CONTROL OF TRAFFIC FLOW

(71) Applicant: Robin Systems, Inc., Milpitas, CA (US)

(72) Inventors: Rafit Izhak-Ratzin, Los Gatos, CA (US); Krishna Satyasai Yeddanapudi, Pleasanton, CA (US); Haim Helman, Los Gatos, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 10 days.

(21) Appl. No.: 14/454,684

(22) Filed: Aug. 7, 2014

(65) Prior Publication Data
US 2015/0071076 A1 Mar. 12, 2015

Related U.S. Application Data

(63) Continuation-in-part of application No. 14/222,370, filed on Mar. 21, 2014.

(60) Provisional application No. 61/876,045, filed on Sep. 10, 2013.

(51) Int. Cl.
*H04L 12/927* (2013.01)
*H04L 12/813* (2013.01)
*H04L 12/851* (2013.01)
*H04L 12/725* (2013.01)

(52) U.S. Cl.
CPC ............ *H04L 47/805* (2013.01); *H04L 47/20* (2013.01); *H04L 47/2408* (2013.01); *H04L 45/302* (2013.01); *H04L 47/24* (2013.01)

(58) Field of Classification Search
CPC .. H04L 47/805; H04L 47/2483; H04L 45/302
See application file for complete search history.

(56) References Cited

U.S. PATENT DOCUMENTS

| | | | |
|---|---|---|---|
| 6,675,218 B1 * | 1/2004 | Mahler | H04L 29/06 370/229 |
| 2004/0022191 A1 * | 2/2004 | Bernet | H04L 12/5695 370/230 |
| 2004/0125806 A1 * | 7/2004 | Barzilai | H04L 29/06 370/395.21 |

(Continued)

*Primary Examiner* — Lakeram Jangbahadur
(74) *Attorney, Agent, or Firm* — David R. Stevens; Stevens Law Group

(57) ABSTRACT

Systems and methods are disclosed for traffic engineering and traffic flow control in a datacenter. Flow agents may be provided at hosts that may be operable to control a rate at which a traffic flow is sent from one point to another within a datacenter to facilitate differing levels of Quality of Service (QoS). The differing levels of QoS may be implemented by differing sizes of bandwidth allocations assigned remotely by a traffic engineering controller. The traffic engineering controller may distribute the differing allocations of bandwidth to the flow agents corresponding to the traffic flows to keep the traffic flow rates within the bandwidth allocation. An augmenting function may also be applied at the traffic engineering controller to maximize bandwidth utilization by checking for unutilized bandwidth and reallocating such bandwidth in accordance with one or more QoS.

11 Claims, 7 Drawing Sheets

(56) References Cited

U.S. PATENT DOCUMENTS

2011/0255538 A1* 10/2011 Srinivasan .......... H04L 41/0893
370/392
2012/0131222 A1* 5/2012 Curtis ................. H04L 47/2441
709/235

* cited by examiner

US 9,882,832 B2

FINE-GRAINED QUALITY OF SERVICE IN DATACENTERS THROUGH END-HOST CONTROL OF TRAFFIC FLOW

RELATED APPLICATIONS

This application claims the priority benefit of U.S. Provisional Application Ser. No. 61/876,045, filed Sep. 10, 2013, the disclosure of which is incorporated by reference herein in its entirety. This application also is a continuation-in-part of U.S. application Ser. No. 14/222,370, filed Mar. 21, 2014, the disclosure of which is incorporated by reference herein in its entirety.

FIELD OF THE INVENTION

This invention relates to networking and, more particularly, to Quality of Service, traffic engineering, and control of traffic flows in datacenter networks.

BACKGROUND OF THE INVENTION

A datacenter may provide many different distributed-processing services within its network, services that may be run on different clusters, or groups, within the datacenter. Such services may entail the performance of different jobs. Different services, groups, jobs, datacenter clients, and/or customers may have differing performance requirements and/or may benefit from different levels of Quality of Service (QoS). To meet performance objectives and realize optimization opportunities in a networking environment, attention can be given to the traffic on datacenter networks and to the efficient use of network resources.

However, the nature of datacenters and/or the services that they provide present some unique challenges for traditional approaches for addressing these issues with network traffic and network resources. Some of these unique challenges are discussed below. In a datacenter environment, therefore, meeting different performance objectives, providing fine-grained levels of QoS, and/or leveraging optimization opportunities, require new innovations.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, can be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

In datacenters with various subsets of traffic having different priorities and/or requirements, approaches to meet performance objectives and/or leverage optimization opportunities may rely upon implementations of different levels of Quality of Service (QoS) for different traffic flows. However, such implementations must address certain characteristics of datacenters. Some of these characteristics are discussed with respect to the following figure.

Figure 1:
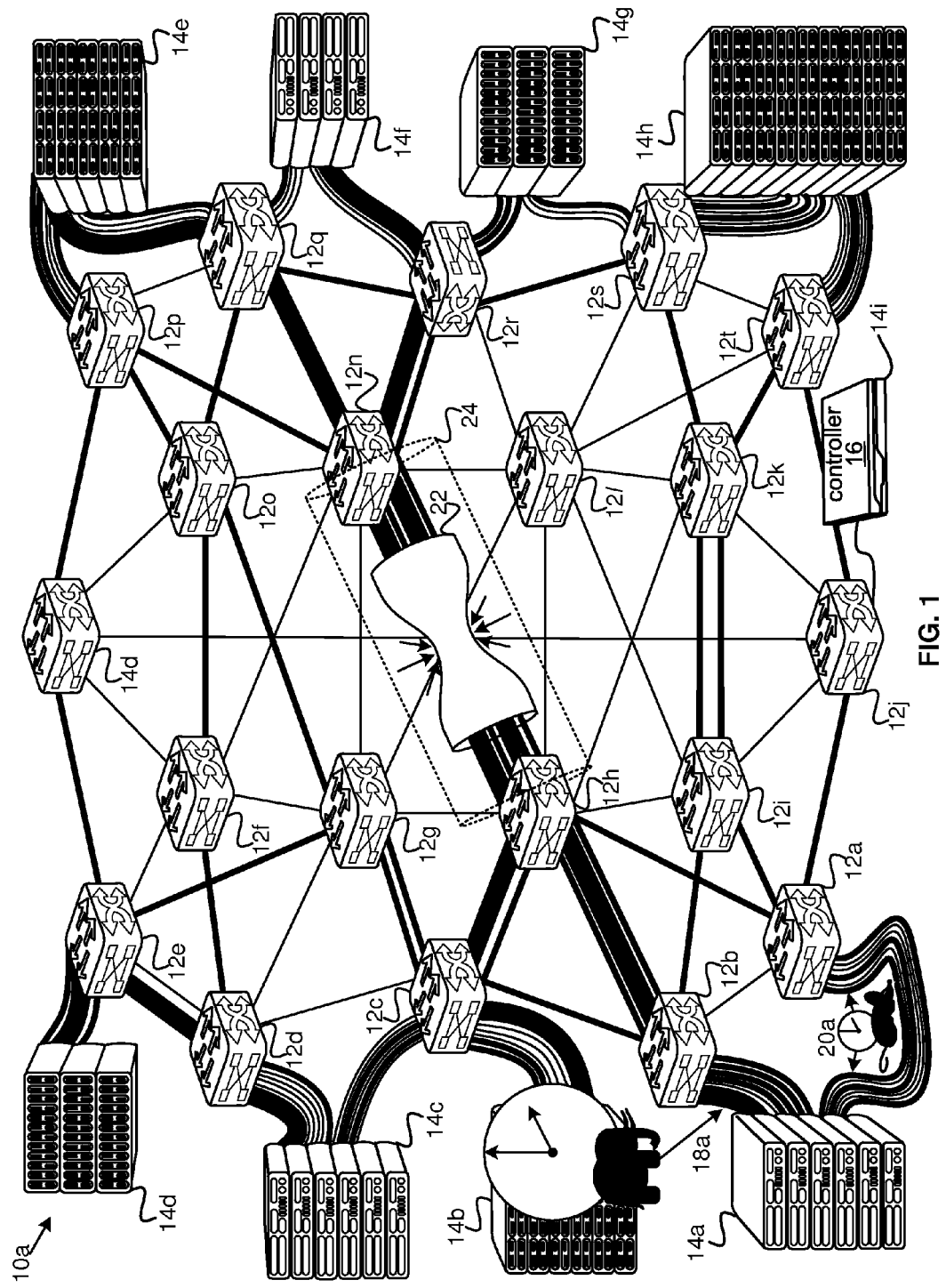
FIG. 1 is a schematic block diagram of different types of traffic flows that can occur in a datacenter network, including long-lived traffic flows and short-lived flows, with a bottleneck resulting from overutilization of certain network resources by multiple traffic flows, in accordance with examples.

Referring to FIG. 1, a datacenter network 10a is depicted. The datacenter 10a may be deployed with one or more switches, routers, hubs and/or the like 12a-p. These network devices 12a-p may be communicatively connected, variously one to another, as depicted in FIG. 1. As can be appreciated, the topography depicted in FIG. 1 is non-limiting. The datacenter 10a and/or the network devices 12 therein, may facilitate, without limitation, east-west traffic flows, or other types of flows.

One or more sets of network hosts 14a-i, a network host also referred to herein as an end host 14, may be communicatively connected to the datacenter 10a. For purposes of this patent application, a set may include any number of elements, including one and zero. A network host 14 may be any form of computing device connected to the datacenter network 10a capable of providing data, receiving data, storing data, and/or processing data for and/or from a user and/or other node in the datacenter network 10a. Without limitation and for purposes of illustration only, a server with a Hard Disk Drive (HDD) may provide an example of a network host 14. Another non-limiting example may include a set of Solid State Drives (SSDs).

Some examples may include one or more controllers 16. Such controllers 16 may provide hierarchical organizational capabilities for services within the datacenter 10a or one or more individual groups or clusters therein.

Having introduced the foregoing potential resources within an exemplary datacenter 10a, the discussion may now turn to the traffic seen at the datacenter 10a. Datacenters 10 can provide sensitive, internet-facing applications, and cloud-based services for large numbers of users. Datacenters 10 can also provide intensive processing services for enormous and ever-growing data sets under time constraints that continue to shrink. Additionally, datacenters 10 can provide storage and backup services for growing amounts of data. The sizes and/or time constraints involved require that the services be distributed across many machines, resulting in levels of traffic with potential performance issues.

The overall traffic in a datacenter 10 may be understood as the aggregate of individual traffic flows. A traffic flow is a series of interrelated frames, and/or packets, sent from a common source machine 14 in the datacenter 10 to a common destination in the datacenter 10. A unique traffic flow may be defined by a unique combination, such as, without limitation, a unique tuple, such as, by way of a non-limiting example: <source IP, destination IP, source Port, destination port>.

In terms of traffic flows, many datacenter's experience what has been called a "big-data" type of traffic, which can have distinctive characteristics. In "big-data" type of traffic, most traffic flows are short in duration and/or bursty. Such short traffic flows are often referred to, because of their relatively small times, and/or the relatively small amounts of information being transferred by these traffic flows, as "mice flows." Other traffic flows, however, may transfer larger amounts of information, potentially over longer periods of time. On account of the relatively large amounts of time involved and/or the relatively large amounts of information being transferred during these relatively large traffic flows, these large traffic flows are often referred to as "elephant flows."

The datacenter 10a is depicted with three such elephant flows 18, indicated as very thick black lines traversing the datacenter 10a. An example elephant flow 18a is denoted with an arrow from an elephant symbol and a large clock, indicative of the relatively lengthy duration of the elephant flow 18a. The exemplary elephant flow 18a is depicted as the series of very thick, bold lines describing a path through the datacenter 10a from an end host 14 in the first set of end hosts 14a, through a first switch 12b, a second switch 12h, a third switch 12n, and a fourth switch 12r, to another end host 14 in another set of end hosts 14f.

In addition to the elephant flows 18, 14 mice flows 20 are also depicted traversing the datacenter 10 as thick black lines, although considerably less thick than those depicting the elephant flows 18. An example mouse flow 20a is denoted with arrows from a mouse symbol and a small clock, symbolizing the short duration of such flows, and is depicted as the series of bold lines describing a path from an end host 14 in the first set of end hosts 14a, through a first switch 12a, a second switch 12j, and a third switch 12t, to another host 14 in another set of end hosts 14h. The ratio of three elephant flows 18 to fourteen mice flows 20 is chosen as fairly representative of typical respective percentages, by way of example and not limitation, of around twenty and eighty percent. Although the number of mice flows 20 is typically greater, the amount of data transmitted by elephant flows 18 is typically greater than the amount of data transmitted by mice flows 20, which, by way of example and not limitation, often involves eighty percent of the data being transmitted by elephant flows 18, but depending on the datacenter, sample, and/or definition, may be reversed.

As can be appreciated, considering the size of data loads within datacenters 10 and the related transfer demands, at times, bottlenecks, latencies, data loss and other performance failures may arise at congested regions within a datacenter 10. The potential for congestion can be increased where multiple long-lived, or elephant traffic flows 18 share a common bandwidth resource in the datacenter due to the length of time that these long-lived traffic flows 18 occupy bandwidth, increasing the window in which congestion can occur. A congested bottleneck 22 is depicted in FIG. 1 by way of example at a particular bandwidth resource 24a within the datacenter 10a. For purposes of this application, a bandwidth resource 24 may refer to one or more communications links between two or more nodes 12/14 within a datacenter 10, determined for its utility for purposes of traffic engineering.

As can be appreciated, two long-lived, traffic flows 18 and two short-lived traffic flows are all competing for a common bandwidth resource between two network devices 12h, 12n, creating the bottleneck 22 with potential negative performance outcomes, such as latency and lost data. The resultant negative performance results may also result in violations of QoS requirements and/or may affect a high priority traffic flow just as much as a lessor priority, or non-priority traffic flow. To prevent such negative outcomes, traffic engineering and/or traffic control innovations for traffic flows in a datacenter 10 are looked to.

For questions of traffic engineering and/or traffic control, the traffic flows in a datacenter 10 may be generally classified, without restriction, according to the distinction between elephant flows 18 and mice flows 20, in terms of two different ranges of temporal duration. Short-lived traffic flows 20, such as some mice flows 20, may persist for shorter durations than may be required to detect, calculate an individualized traffic-engineering solution for, or control a short-lived traffic flow. Costs to various computational resources may also suggest against individualized attention to such flows.

Conversely, long-lived traffic flows 18, such as some elephant flows 18, may last for a sufficient duration of time to benefit from individualized traffic engineering and control efforts. However, even the elephant, or long-lived traffic flows 18 within datacenters 10 are relatively brief. Therefore, the term 'long-lived' may be limited in its application relative to the time scales involved with short-lived traffic flows 20.

Because of the short duration of even long-lived traffic flows 18 in datacenters 10, the application of traffic and engineering solutions applied in other contexts is not applicable in the present context. For example, some traffic engineering approaches compute optimizing, individual paths for traffic, but on time scales measured in hours. Such time scales are problematic in datacenters 10 where very few traffic flows persist more than 100 seconds, a majority of traffic flows cannot be measured in tens of seconds, and time scales measured in seconds, particularly lower numbers of seconds, are useful for measuring most elephant, or long-lived traffic flows 18. At such time scales, the speed at which long-lived traffic flows are identified may play an important role, as may the speed of any computations involved in providing traffic engineering solutions.

Additionally, the growing demands placed on datacenters 10 may make them somewhat organic and subject to constant change, making scalability an issue. The same and similar reasons, such as a need to keep a datacenter 10 online, may make minimal modifications for implementation desirable. Additionally, traffic engineering, control, and the providing of reliable QoS may be improved and/or require a global awareness of, for example, datacenter topology and/or other traffic flows in a datacenter 10. Additionally, the effectiveness of QoS classifications may be improved where such classifications are tailored to features relevant to a datacenter environment 10. Novel approaches for addressing such datacenter-specific issues are required. A brief overview of some of such innovations is provided below.

A system may be provided for supporting one or more levels of QoS in a datacenter through bandwidth allocation(s). Such a system may include both one or more flow agent(s) and a traffic engineering controller. The traffic engineering controller may allocate a portion of bandwidth in the datacenter 10 to a long-lived traffic flow 18 to support one or more levels of QoS and may communicate this bandwidth allocation to a flow agent for enforcement.

For example, the flow agent(s) may be operable to run within user space at one or more end hosts 14 within the datacenter 10. Such an end host 14 may have a Central Processing Unit (CPU), memory, and a Network Interface Controller (NIC). Additionally, the flow agent may further include a control module operable to control a rate at which a traffic flow is sent over the NIC at the end host 14 to help ensure a QoS, or other performance requirement, is met and/or prevent bottlenecking and/or overutilization of network resources. As discussed below, the ability to control the rate at which a traffic flow is transmitted, may lend itself, more than just to traffic control, but also to ensuring a QoS. By assigning control operations to end host(s) 14, as opposed to network devices per conventional approaches, such as through switch tables, the control operations may become more scalable and may be implemented with fewer modifications.

In some examples, the flow agent may further include a classification module operable to classify a traffic flow as a long-lived traffic flow 18. By identifying a long-lived traffic flow at its source 14, as opposed to conventional approaches involving the periodic polling of network devices 12, identifications may be made more rapidly. A report module may be included with the flow agent that may be operable to generate a report on the traffic flow and to provision the report to the traffic engineering controller. Certain examples may facilitate such operations with a monitoring module and/or a copy module.

The monitoring module may include a send function operable to send at least one frame/packet pertaining to the traffic flow from a socket at the end host 14. The copy module, which may comprise a portion of the send function, may be operable to copy classification information from a call to the send function for the traffic flow. In such examples, the classification module may make a designation that a traffic flow is a long-lived traffic flow 18 where at least one value of the classification information for the traffic flow exceeds a corresponding threshold value. Additionally, the report module may generate the report with the classification information.

With respect to the traffic engineering controller, which services the datacenter 10, this component may be hosted by a computer, having a separate CPU, separate memory, and a separate NIC. However, in some cases, the traffic engineering controller may run on a computing device also supporting a flow agent. The traffic engineering controller may further comprise an allocation module operable to provide, over the separate NIC, a bandwidth allocation, for a traffic flow, to the flow agent controlling the traffic flow. Because the traffic engineering controller services the datacenter 10 and may be in communication with multiple flow agents, it may be utilized, as discussed further below, to provide traffic engineering solutions with a global awareness. Additionally, the traffic engineering controller may set the size of the bandwidth allocation as indicated by a QoS identified for the traffic flow relative to a second QoS for at least one additional traffic flow, in accordance with a weighting function and/or an augmenting function.

Some examples may include one or more modules with the traffic and analytic controller operable to provide information about multiple long-lived traffic flows in the datacenter 10 to the allocation module. Non-limiting examples of such modules may include an aggregation module, a path module, and/or an availability module. The aggregation module may be operable to collect multiple reports on multiple long-lived traffic flows 18 within the datacenter 10. The path module may be operable to determine paths for the multiple long-lived traffic flows 18 across a topology and/or an overlay of a topology of the datacenter 10. The availability module may be operable to establish a bandwidth for a bandwidth resource 24 in the datacenter 10 traversed by the traffic flow for which a bandwidth allocation is being made.

In some examples, the allocation module may also be operable to apply an augmenting function to maintain high utilization of available bandwidth. High utilization of bandwidth may refer to the allocation of one useful portions of bandwidth that are available in the datacenter. The augmenting function may be operable to check for available bandwidth based on the multiple reports from the aggregation module, the paths determined by the path module, and/or the bandwidths established by the availability module. Furthermore, the augmenting function may reallocate additional bandwidth from the available bandwidth to one or more long-lived traffic flows according to at least one QoS corresponding individually to a long-lived traffic flow 18.

The creation of a separate traffic engineering controller receiving reports on long-lived traffic flows 18 from multiple flow agents at multiple end hosts 14 may be leveraged to acquire and utilize global information, such as the topology information and information about multiple long-lived traffic flows 18. The traffic engineering controller and/or the allocation module may utilize such information to fully allocate available bandwidth in the datacenter among multiple traffic flows, including the traffic flow discussed in the preceding paragraph. Additionally, the information may be used to prevent each traffic flow of the multiple traffic flows from stagnating.

The allocation module may utilize the foregoing examples of information to inform its allocations of bandwidth. For example, where the allocation module may be informed of multiple, long-lived traffic flows 18 competing for a common bandwidth resource 24, the allocation module may distribute differing sized allocations of bandwidth to individual traffic flows from the multiple traffic flows as a function of corresponding QoS values assigned to the individual traffic flows. A QoS value/level may represent classes defined by features common to datacenters 10, such as, without limitation, examples discussed below.

In addition to differing QoS values/levels for different traffic flows, other guiding principles in bandwidth allocation may include, for example, preventing starvation for any single traffic flow and/or maximizing utilization of available bandwidth. With respect to the principle of maximizing bandwidth utilization, for example, in some cases, a limiting bandwidth allocation to a first traffic flow 18 at a link pertaining to a first path through a datacenter 10 may reduce the bandwidth occupied by the first traffic flow 18 elsewhere, at other links, in the first path. A second path through the datacenter 10 may also pass through one or more of these links that are not fully occupied, in addition to other links not traversed by the first path. To maximize utilization of available bandwidth in such examples, a second traffic flow traversing the second path, potentially of lower priority than the first traffic flow, may be allocated some or all of the unoccupied bandwidth resulting from the limiting bandwidth allocation to the upstream link in the first path.

For example, with respect to FIG. 1, a first path for a first, long-lived traffic flow may commence at a set of end hosts 14a and proceed through switch 12b, switch 12h, switch 12n, and switch 12r to another end host 14 in another set of end hosts 14f. Similarly, a second path for a second, long-lived traffic flow may commence at a yet another set of end hosts 14b and proceed through switch 12c, switch 12h, switch 12n, and switch 12q to a terminal end host 14 in yet another set of end hosts 14f. As can be appreciated, both the first path and the second patch share a common link between switch 12h and switch 12n.

A limiting bandwidth allocation in the first path upstream at the edge link between the initial set of end hosts 14a and switch 12b reduces the bandwidth occupied by the first, long-lived traffic flow at the link between switch 12h and switch 12n shared with the second path. The first, long-lived traffic flow on the first path may have a QoS with a higher priority. However, to maximize utilization of bandwidth at the link shared by the first path and the second path between switch 12h and switch 12n, some of the bandwidth not occupied by the first, long-lived traffic flow due to the upstream, limiting allocation, may be allocated to the second, lower-priority, long-lived traffic flow.

Figure 2:
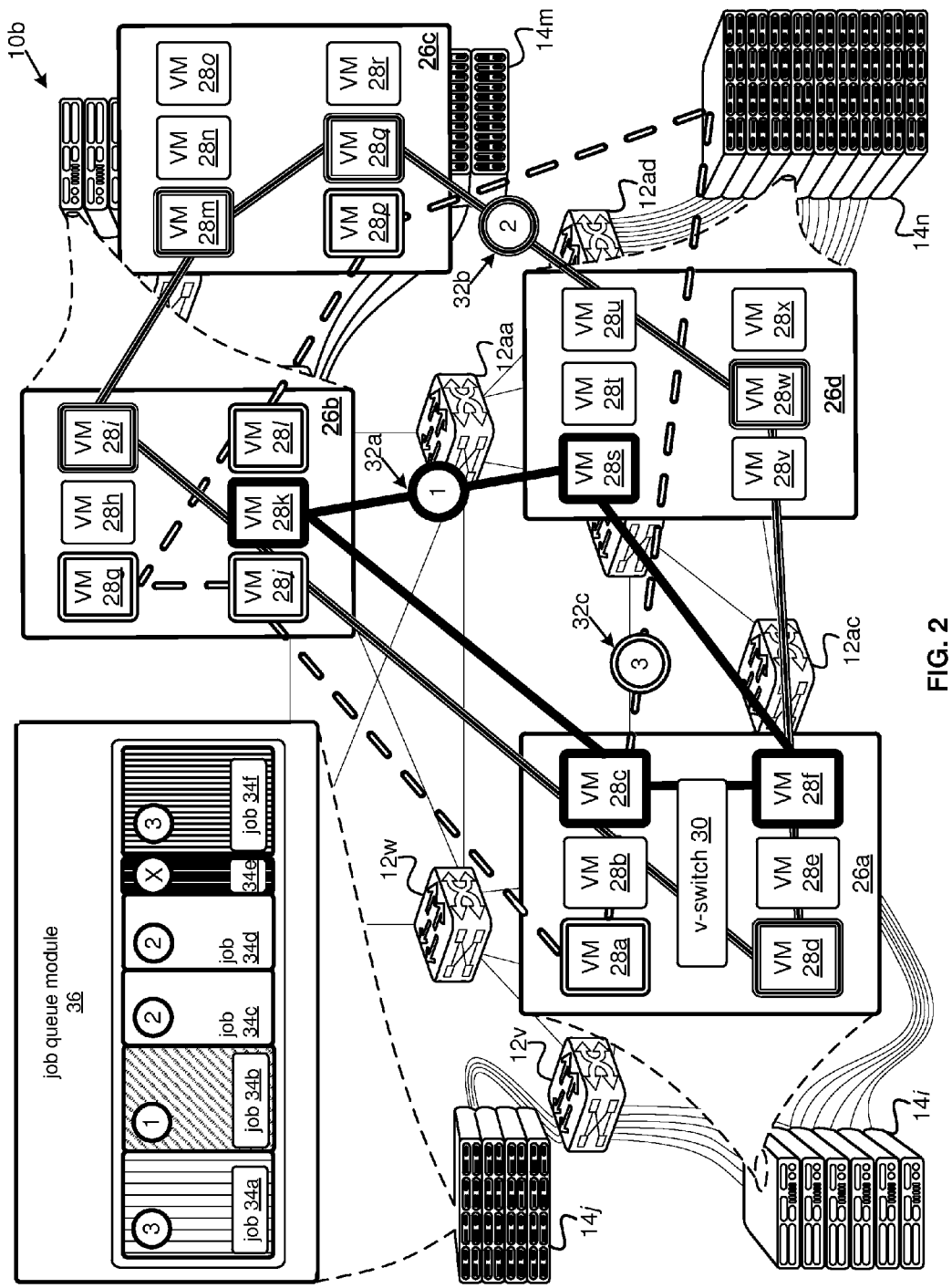
FIG. 2 is a schematic block diagram of non-limiting examples of potential distinctions that may serve as bases for different, fine grain Quality of Service (QoS) classifications, together with a datacenter including multiple virtual computing instances, in accordance with examples.

Referring to FIG. 2, another example of a datacenter 10b with a slightly different topology is depicted. As can be appreciated, any number of topologies are possible. Such a datacenter 10b may include multiple network devices 12a-k, multiple sets 14i-n of end hosts 14. Additionally, one or more end hosts 14 in the datacenter 10b may support a virtual computing environment 26a-d.

Such virtual computing environments 26 may support multiple virtual computing instances 28a-x, which may or may not be implemented as one or more Virtual Machines (VMs) 28. A first example of a virtual computing environment 26a is depicted with slightly enlarged dimensions for purposes of explanation. In addition to the multiple virtual computing instances 28a-f and/or VMs 28a-f supported by the virtual computing environment 26a, a virtual switch 30 may be provided to facilitate communications from and/or to the virtual computing devices 28a-f. Although not depicted, additional instances of virtual computing environments 26 may include virtual switches 30.

Also depicted are multiple clusters 32a-c, or groups 32a-c, within the datacenter 10. Such groups/clusters 32 may be virtual clusters/groups 32, clusters/groups 32 of physical machines 14, and/or clusters/groups 32 with both physical and virtual components. A virtual group/cluster 32, may be made up of multiple virtual computing instances 28. Different groups/clusters 32 may be dedicated to providing different services. For example, and without limitation, one group may provide production services, another may provide development services, while yet another may provide testing.

Three examples of such clusters/groups 32a-c are depicted in FIG. 2 by means of three different interconnected loops with three different types of thick lines passing through and encircling and/or anchored by members of their respective groups/clusters 32a-c. For example, a first group/cluster 32a, depicted with the solid black line, includes virtual computing instance 28c, virtual computing instance 28k, virtual computing instance 28s, and virtual computing instance 28f.

A second group/cluster 32b is delineated by the interconnected loop of tri-band segments; and, a third group/cluster 32b is delineated by the interconnected loop of outlined, dashed segments. As can be appreciated, these rings serve to logically identify members of a group/cluster 32 and do not represent communication links, or restrict the pathways of communication. Individual members of a group/cluster 32 may rely on communication links provided by the underlying datacenter network 10.

As depicted, different clusters/groups 32a-c may be intertwined throughout the datacenter 10 and may rely on common communication links. Furthermore, such clusters/groups 32a-c may individually generate "big-data" traffic flows, with long-lived traffic flows 18 and short-lived traffic flows 20. Therefore, the potential for congestion, bottlenecks 22 and/or negative performance outcomes arises. However, although traffic flows from two or more clusters/groups 32 may equally share the resultant, negative impacts, the implications may not be equal.

The activities of various clusters/groups 32 may have different service priorities relative to one another and/or different requirements, with negative performance outcomes having consequences of different levels of importance. One way in which to be responsive to these different consequences linked to the different clusters/groups 32 of a datacenter 10 is to assign a QoS, or some portion thereof, to a long-lived traffic flow 18 based the cluster/group 32 within which the long-lived traffic flow 18 is generated. Such an approach may provide one non-limiting examples of providing fine-grained QoS options, tailored to datacenter characteristics to meet and/or reliably deliver different performance requirements.

For example, long-lived traffic flows 18 from the first cluster/group 32a may be assigned a QoS level/value of 1, as indicated by the circled numeral of the interlinked loop used to depict the first cluster/group 32a, based on activities undertaken by the first cluster/group 32a. Similarly, long-lived traffic flows 18 from the second cluster/group 32b may be assigned a QoS level/value of 2. And, those from the third cluster/group 32c may be assigned a QoS level/value of 3. Hence, a QoS value may represent a virtual cluster 32 in which a corresponding, individual, long-lived traffic flow 18 is generated.

With respect to another degree of granularity for QoS levels/values, multiple different jobs 34a-f may be executed within a common cluster/group 32. In some, but not necessarily all, examples, the jobs 34a-f may be stored in a job queue 36. Also, in some, but not necessarily all, examples, the job queue 36 may be maintained by an end host 14, such as the top end host 14 of the 14*j* set of end hosts.

Furthermore, individual jobs 34 may produce "big-data" type traffic, with long-lived traffic flows 18 and short-lived traffic flows 20. Also, the importance, performance needs, and/or performance tolerances associated with one job 34 may vary relative to another. One non-limiting example may be found in the distinction between a user job 34 and a backup job 34.

A QoS, or some portion thereof, consequently, may be assigned based on a job 34 responsible for generating the corresponding, long-lived traffic flow 18 during execution within the datacenter 10. Therefore, a QoS value may represent a QoS value assigned to a job 34 responsible for generating the corresponding, individual traffic flow 18. In FIG. 2, different jobs 34*a-f*, of differing sizes are represented by different sized blocks with differing cross-hatching patterns. QoS levels/values are represented by circled numbers. As can be appreciated, similar jobs 36*c*, 36*d*, may share a common QoS levels/values. As indicated by the 'X', it is possible that some jobs 34, such as job 36*e*, don't receive a QoS level/value.

Additional classes of long-lived traffic flows 18 may be supported and/or receive QoS designations. By way of providing a non-limiting examples, a QoS value/level may be assigned to a long-lived traffic flow 18 on the basis of customer configuration. By way of other non-limiting example, long-lived traffic flows 18 pertaining to applications and/or different phases of an approach to data processing, such as, without limitation, a Map phase and a Reduce phase, may be assigned differing QoS values/levels. An overall QoS may be determined by a combination of multiple QoS values.

Additionally, relative priorities for QoS level/values may be denoted by descending values or ascending values, by letters, symbols, or other means. Aside from, or in addition to, service priority, QoS level/values may represent one or more performance requirements and/or values for performance metrics, such as, by way of example and not limitation, transmission delay and/or data loss tolerance. The following figures are used to explain some examples of ways in which the foregoing, fine-grained, datacenter-specific QoS may be implemented in a datacenter 10.

Figure 3:
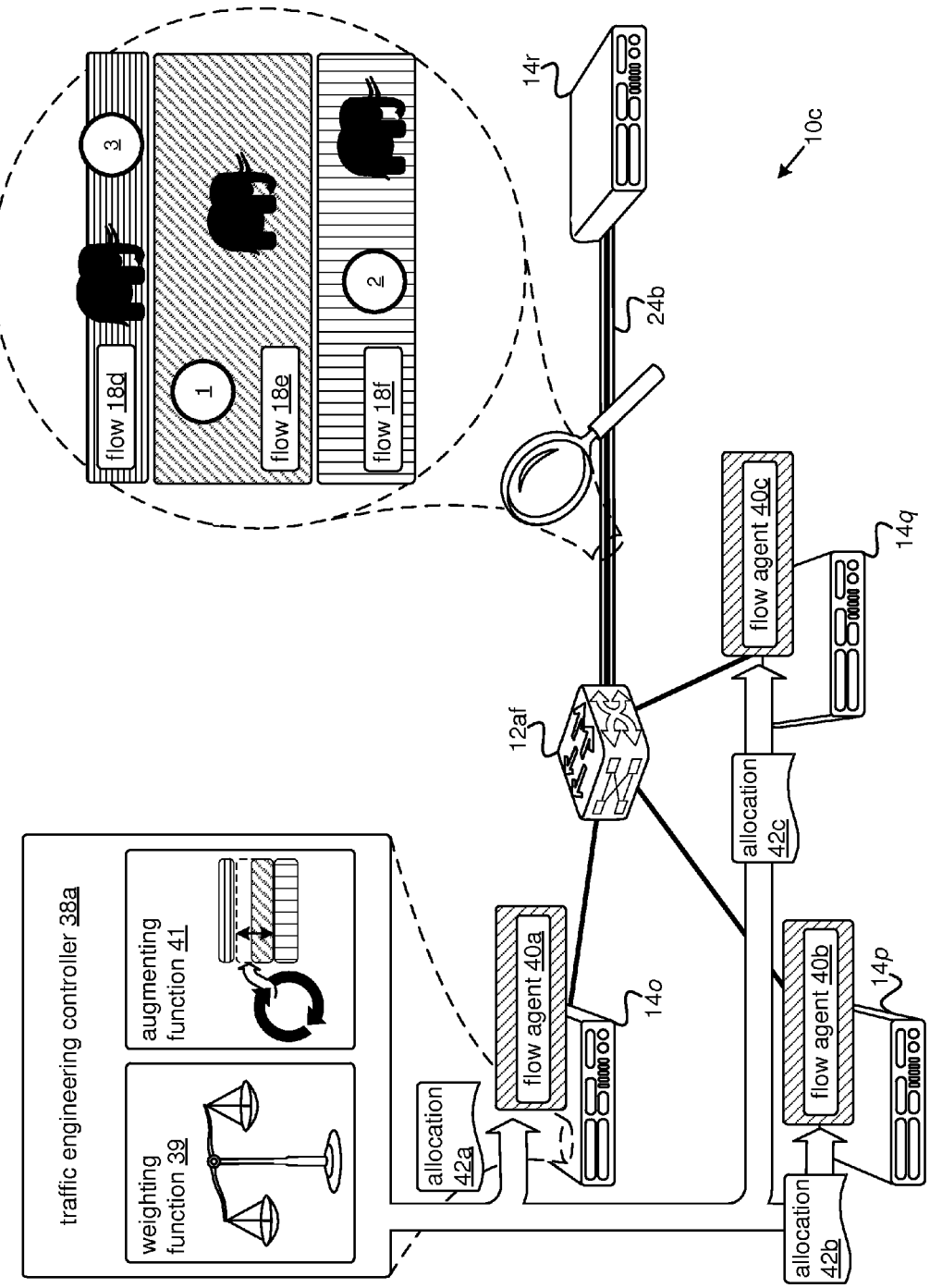
FIG. 3 is a schematic block diagram of flow agents at end hosts coupled to a traffic engineering controller with a global view of traffic flows as provided by the flow agents quickly identifying and reporting long-lived traffic flows, the flow agents also controlling the send rate of traffic flows according to bandwidth allocations from the traffic engineering controller, in accordance with examples.

Referring to FIG. 3, enforcement results implementing QoS levels are depicted for a traffic engineering controller 38*a* applying a weighting function 39 to instruct one or more flow agents 40, and/or applying an augmenting function 41, with different bandwidth allocations 42. Also depicted, in a portion of a datacenter 10*c*, are an end host 14*o* hosting the traffic engineering controller 38*a* and three transmitting end hosts 14*o-q* having corresponding flow agents 40*a-c*. As can be appreciated, the traffic engineering controller 38*a*, in the present example, is hosted by an end host 14*o* that also hosts flow agent 40*a*. Depending, on the example, a traffic engineering controller 38 and a flow agent 40 may be hosted by the same end host 14, or the traffic engineering controller 38 may be hosted by itself. All three transmitting end hosts 14*o-q* share a common destination end host 14*r*, accessed over a common network device 12*af*, with a communication link between the network device 12*af* and the destination end host 14*r* making up a bandwidth resource 24*b* in the portion of the datacenter 10*c*.

The traffic engineering controller 38*b* may bear the burden of balancing the long-lived traffic flows 18 across the datacenter network 10, including those at the shared bandwidth resource 24*b*. To arbitrate the competition for the shared bandwidth resource 24*b*, the traffic engineering controller 38*b* may apply a weighting function 39 to produce bandwidth allocations 42*a-c* for communication to the various flow agents 40*a-c* at the end hosts 14*o-q* originating the long-lived traffic flows 18*d-f* to which the bandwidth allocation 42*a-c* are made. The flow agents 40*a-c* may be operable to control their corresponding long-lived traffic flows 18*d-f* in keeping with the bandwidth allocations 42*a-c* to support differing levels of QoS for the different long-lived traffic flows 18*d-f*.

As depicted in the expanded view of the bandwidth resource 24*b*, the weighting function 39 may prescribe greater amounts of bandwidth to a long-lived traffic flow 18 assigned a higher-priority QoS. For example, the long-lived traffic flow 18*e* with the highest-priority of service, indicated by the circled number one, is depicted with the thickest band, indicative of the largest bandwidth allocation. As the priorities of the corresponding QoS assigned to the remaining long-lived traffic flows 18*d*, 18*f* diminish, as indicated by the second and third level respective positions for these long-lived traffic flows 18*f*, 18*d*. The weighing function 39 may, in turn diminish the amount of allocated bandwidth. As can be appreciated, different numbers of level of QoS may be supported, allowing for a fine-grained approach to QoS. Additional details expounding on potential implementations of a traffic engineering controller 38 are set forth below.

In some examples, the traffic engineering controller 38*a* and/or an allocation module therein, as introduced below, may apply an augmenting function 41. The augmenting function may iteratively augment the bandwidth of long-lived traffic flows 18 whose paths through the datacenter 10, or portions thereof, are not yet saturated. Therefore, the augmenting function 41 may be applied one or more times to improve utilization of available bandwidth in the datacenter 10.

In such examples, the augmenting function 41 may be operable to check for available bandwidth for active flow paths in the datacenter. An active flow path is defined as a flow path from a source end host 14 to a terminal end host 14 traversed by a long-lived traffic flow. Additionally, the augmenting function 41 may be operable to reallocate additional bandwidth from the available bandwidth found in the data center to at least one long-lived traffic flow. The augmenting function 41 may make such reallocations according to at least one priority determined for an individual long-lived traffic flow by a priority module discussed below. For some subset of such examples, the traffic engineering controller 38*a* and/or the allocation module may be operable to apply the augmenting function 41 repeatedly until the available bandwidth drops below a threshold. Such a threshold may be set in advance and may include a minimum usable portion of bandwidth. In some examples, the weighting function 39 and the augmenting function 41 may run together.

As can be appreciated, many of the functionalities discussed with respect to approaches to QoS, traffic engineering, and/or traffic control in datacenters 10 may be provided by modules. Throughout this application, the functionalities discussed herein may be handled by one or more subsets of modules. With respect to the modules discussed herein, aspects of the present innovations may take the form of an entirely hardware embodiment, an entirely software embodiment (including firmware, resident software, micro-code, etc.), or an embodiment combining software and hardware aspects that may all generally be referred to herein as a "module." Furthermore, aspects of the presently discussed subject matter may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as C++, or the like, and conventional procedural programming languages, such as the "C" programming language, or similar programming languages. Aspects of a module, and possibly all of the modules, that are implemented with software may be executed on a micro-processor, Central Processing Unit (CPU) and/or the like. Any hardware aspects of the module may be implemented to interact with software aspects of a module.

Figure 4:
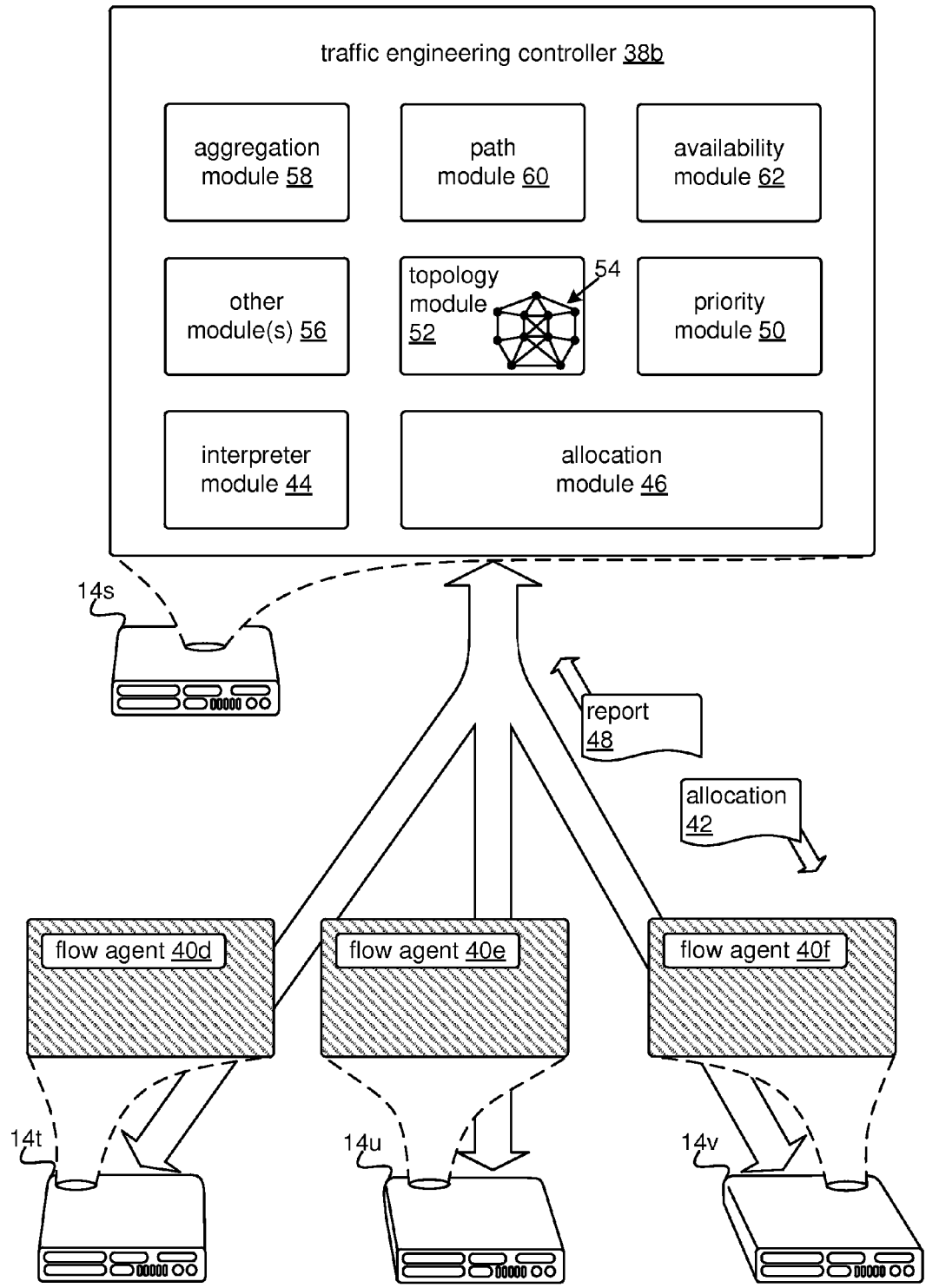
FIG. 4 is a schematic block diagram of a flow agent at an end host demonstrating potential aspects of the monitoring of traffic flows and the identification of long-lived traffic flows, the flow agent servicing multiple virtual computing instances within a virtual computing environment supported by the end host, in accordance with examples.

Referring to FIG. 4, a centralized solution for supporting one or more QoS designations and for providing traffic engineering in a datacenter 10 is depicted as a system including a traffic engineering controller 38b. The traffic engineering controller 38b may be hosted by a computer 14s having a CPU, memory, and one or more NICs. The example depicted in FIG. 4 shows a particular end host 14s hosting the traffic engineering controller 38b. However, any computer 14 connected to the datacenter 10 may serve as a host.

The traffic engineering controller 38b, which may be operable to be executed by the CPU of the computer 14s, may support different classes of long-lived traffic flows 18 with different QoS values/levels while balancing loads on the datacenter 10. The traffic engineering controller 38b may bear the responsibility of balancing long-lived traffic flows 18 across a datacenter 10, while providing different levels of QoS to different traffic flows. To provide QoS to long-lived traffic flows 18, the traffic engineering controller 38b may divide up bandwidth in the datacenter 10 and assign QoS-weighted bandwidth allocations 42 to the long-lived traffic flows 18 and or may maintain high utilization of available bandwidth by applying the augmenting function 41.

Also depicted are multiple traffic generating end hosts 14t-v, each hosting an instance of a flow agent 40d, 40e, 40f. The traffic engineering controller 38b may be communicatively coupled with one or more flow agents 40 over the datacenter network 10, whether within a data plane, a designated control plan, and/or over a separate network constituting a backplane. The traffic engineering controller 38b may, therefore, communicate one or more bandwidth allocations 42 for one or more long-lived traffic flows 18 to one or more corresponding flow agents 40 at the end host(s) 14 at which these traffic flows 18 originate to uniquely delegate traffic control and enforcement to the end host(s) 14.

The traffic engineering controller 38b may include an interpreter module 44 and/or an allocation module 46. The interpreter module 44 may be operable to receive one or more reports 48 on one or more long-lived traffic flows 18 identified by one or more flow agents 40 at one or more end hosts 14 within a datacenter 10 serviced by the traffic engineering controller 38b. Furthermore, the interpreter module operable 44 may be operable to interpret the one or more reports 48 and the implications for implementing QoS classes.

The allocation module 46 may be operable to assign one or more allocations of bandwidth 42, supporting one or more QoS values/levels, to the long-lived traffic flows 18 and to communicate the allocation(s) of bandwidth 42 to the flow agent(s) 40. The allocation module 46 may include and/or have access to the weighting function 39 and/or the augmenting function 41. The allocation module 46 may communicate the allocation(s) of bandwidth 42 so that the flow agent(s) 40 may control one or more rates at which the long-lived traffic flow(s) 18 is/are sent. By controlling the rate(s) at which the long-lived traffic flow(s) 18 are transmitted at the end host(s) 14 at which they originate, the flow agent(s) 40 may control the long-lived traffic flow(s) 18 and keep the long-lived traffic flow(s) 18 within the corresponding allocation(s) of bandwidth 42.

In some examples, the interpreter module 44 may be operable to identify a QoS for one or more individual, long-lived traffic flows 18. Also, the traffic engineering controller may further include a priority module 50. The priority module 50 may be operable to apply a weighting function 39 to one or more long-lived traffic flows 18. The weighting function 39 and/or the augmenting module 41 may prescribe one or more corresponding allocations of bandwidth 42 as a function of one or more identifications of QoS identified for the long-lived traffic flow(s) 18. In some examples, the priority module 50 may prescribe an allocation of bandwidth 42 to a first long-lived traffic flow 18 based on the QoS assigned to the first long-lived traffic flow 18 relative to a second QoS for a second long-lived traffic flow 18 and/or additional indications of QoS for further long-lived traffic flows 18.

A topology module 52 may be included with the traffic engineering controller 38b for some examples. The topology module 52 may maintain a description of a topology 54 of the datacenter 10 and/or a description of a topology overlay and/or a portion thereof Potentially, the description of the topology 54 may be maintained as a data structure and/or database of a graph with edges, nodes, and/or information about communication links and/or capacities. For certain examples, an administer may input the data making up the description of the topology 54. Additionally, or in the alternative, elements of the datacenter 10 may communicate such information to the traffic engineering controller 38b, and/or topology module 52 upon being connecting to the datacenter 10 and/or from time to time. Also, or in the alternative, the traffic engineering controller 38b, and/or topology module 52 may send out queries to acquire such information.

The topology module 52 may access information provided by the interpreter module 44 and/or directly from one or more reports 48 about one or more long-lived traffic flows 18 to map one or more paths for one or more long-lived traffic flows 18 through the datacenter 10. Such information may include source and/or destination information for a given traffic flow. In some examples, the topology module may apply one or more routing algorithms to determine a path for a given long-lived traffic flow 18. Also, or in the alternative, information about one or more nodes traversed by the long-lived traffic flow may be acquired from the report 48.

The topology module 52 may be further operable to determine an available bandwidth for one or more bandwidth resources 24 in the datacenter 10. In some examples, the topology module 52 may accomplish this by referencing the description of the topology 54. The topology module 52 may communicate this information to the allocation module 46. Therefore, the allocation module 46 may be further operable to distribute multiple allocations of bandwidth 42 between multiple long-lived flows 18 mapped to concurrently pass through a common bandwidth resource 24 by the topology module 52. The allocation module 46 may derive the multiple allocations 42 by a QoS-based weighting function 39 and/or an augmenting function 41 directly or indirectly.

In accordance with certain examples, the allocation module 46 may assign the available bandwidth for a bandwidth resource 24 in full. Furthermore, the allocation module 46 may assign the available bandwidth such that each long-lived traffic flow 18 sharing the bandwidth resource 24 receives at least a portion of the available bandwidth so that no long-lived traffic flow 18 stagnates. Also depicted within the traffic engineering controller 38b, are an aggregation module 58, a path module 60, and an availability module 62. As can be appreciated, any of the depicted modules may be considered as part of another module and/or separate from other modules, and the depicted groupings are not intended to be limiting. Also, in some examples, one module may perform functionalities described with respect to another module. Also, other modules not depicted herein may be relied upon to perform additional functionalities described herein.

For example, the aggregation module 58 may provide functionalities associated with the interpreter module 44, may work in conjunction with the interpreter module 44, and/or provide input to the augmenting function 41. The path module 60, like the topology module 52, may be operable to determine paths for the multiple long-lived traffic flows 18 across a topology of the datacenter 10, using a description of topology 54 maintained by the topology module 52. Alternatively, the path module 60 may acquire this path information from the topology module 52 for use by the augmenting function 41. Similarly, the availability module 62 may be operable to establish an available bandwidth for a bandwidth resource 44 in the datacenter 10 traversed by a given traffic flow, may acquire this information from the topology module 52, may work in conjunction with the topology module 52, and/or may provide the bandwidth information to the augmenting function 41. In some examples, a determination of available bandwidth may include a margin for error.

With bandwidth allocation activities located in a centralized traffic engineering controller 38, analysis used to make bandwidth allocations 42 may be informed by information across the datacenter 10. For example, allocations 42 can be made that can take into account the paths of other, and potentially all, long-lived traffic flows 18 in the datacenter 10. Therefore, allocation determinations may be made that can avoid surprises and/or reliably support one or more QoS options for long-lived traffic flows 18. As stated, and discussed in more detail below, identification and/or control of such long-lived traffic flows 18 may be delegated to one or more flow agents 40.

Figure 5:
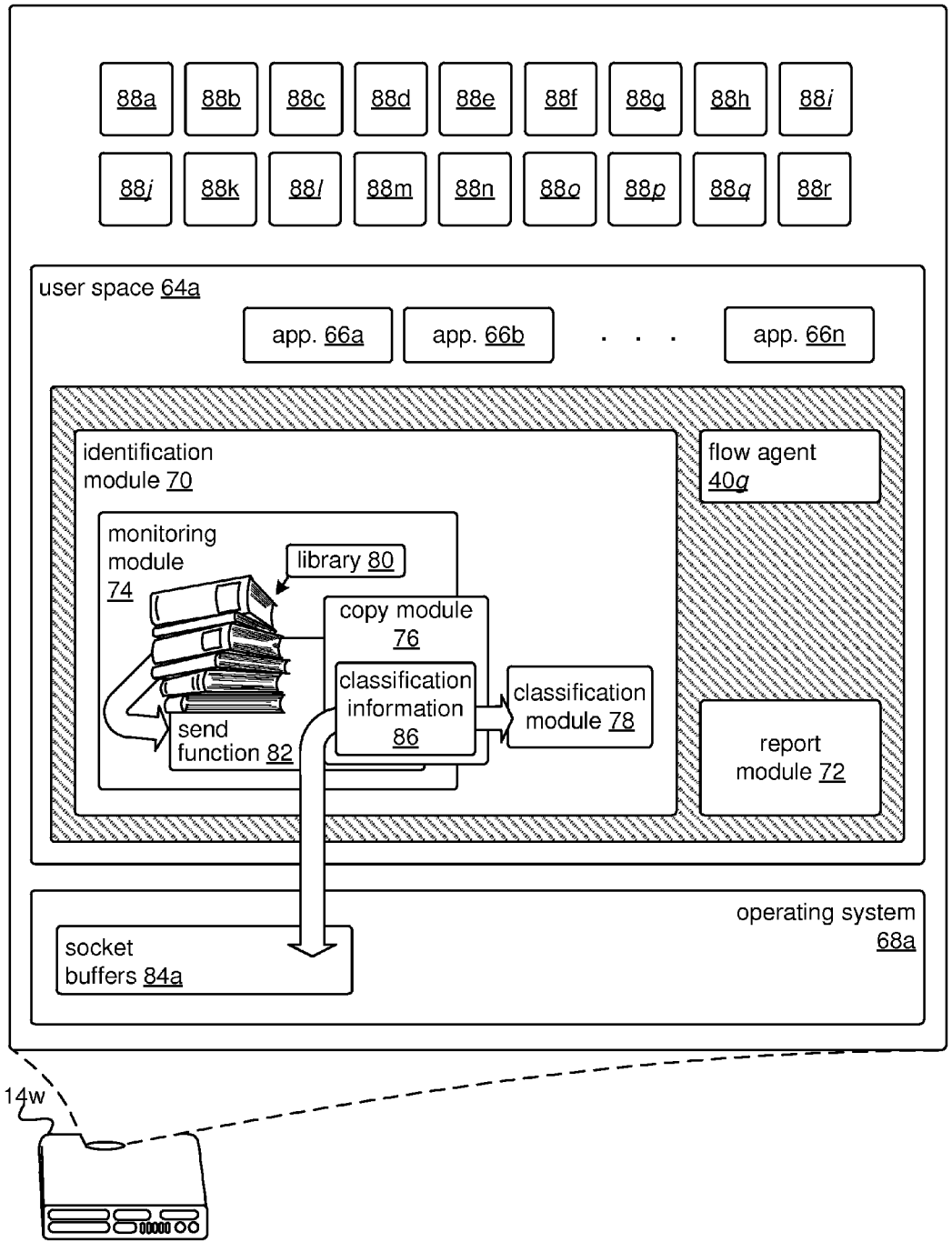
FIG. 5 is a schematic block diagram of the enforcement of different bandwidth allocations to traffic flows, with differing levels of QoS, that share a bandwidth resource, the different allocations being made by a traffic engineering controller applying a weighting function and/or augmenting function to the differing levels of QoS and communicating the resultant allocations to the flow agents that control the rate at which the traffic flows are sent, in accordance with examples.

Referring to FIG. 5, a flow agent 40d, hosted by an end host 14s from a datacenter 10, is depicted. The end host 14s may include a CPU, memory, and one or more NICs. The flow agent 40g may be operable to run within a user space 64a of the end host 14s with other applications 66a-c, apart from an operating system 68a of the end host. To assist the traffic engineering controller 38 by providing information about traffic flows generated at the end host 144, the flow agent 40g may include an identification module 70 and/or a report module 72.

By delegating the identification of long-lived traffic flows 18 to one or more flow agents 40 at the end host(s) 14 where the flows are generated, savings of time may be gained in the identification process. These time savings can be leveraged to implement traffic engineering and/or QoS in a datacenter 10 handling "big-data" type traffic, for which even long-lived traffic flows 18 can be relatively short. Such savings of time arise in contrast to the conventional approach, applied in environments such as HEDERA and HELIOS that, for flow identification, polls network devices 12 reached downstream in a path traversed by a traffic flow.

The identification module 70 may be operable to identify a traffic flow originating at the end host 14 as a long-lived traffic flow 18. In some examples, the identification module 70 may identify a traffic flow as a long-lived traffic flow 18 where the identification module 70 identifies a traffic flow as exceeding one or more thresholds for one or more flow metrics. Examples of such flow metrics may include, without limitation, an interval of time over which a traffic flow persists, a data rate for a traffic flow derived by an amount of data transferred in a given time interval, an aggregate size of data transferred during the flow, and/or generation of a traffic flow by a process, or application 66, known for generating long-lived traffic flows 18.

Some non-limiting examples of values for some of these flow metrics, provided by way of example, may include 1 MB of data, with respect to size, 5 MBps with respect to a rate, and/or 100 micro seconds, with respect to duration. One or more flow metrics and/or corresponding thresholds may be selected as indicia justifying analysis by the traffic engineering controller 38. For example, a threshold of an amount of time required to analyze and/or apply a traffic control to the traffic flow may be selected.

The report module 72 may be operable to prepare a report 48 on one or more traffic flows identified as long-lived traffic flows 18. Additionally, the report module 72 may be operable to provision the report 48 for transmission to the traffic engineering controller 38, for analysis, over a NIC at the end host 14w. The report module 72 may be configured, by way of example and not limitation, to provide a report 48 to the traffic engineering controller 38 at a fixed time interval, upon receiving a query from the traffic engineering controller 38, and/or in response to a trigger event, such as the identification of one or more long-lived traffic flows 18.

With respect to additional details on the identification of long-lived traffic flows 18, in some examples, the identification module 70 may include a monitoring module 74, a copy module 76, and/or a classification module 78. The monitoring module 74 may be operable to monitor frames/packets generated at one or more applications 66a-n within user space 64a that produce traffic in the datacenter 10. By placing the flow agent 40g in the user space 64a, additional time savings may be made. For example, the use of a kernel module could introduce multiple context switches to move between unprivileged mode for processes associated with the application(s) 66 generating traffic flows and privileged mode used by kernel space. Each switch may entail saving and/or restoring registers, flushing and/or reloading of buffers, and/or flushing of a processor pipeline.

To monitor frames/packets being introduced into the traffic of the datacenter 10, the identification module 70 may include a system-call library 80. The system-call library 80 may provide a set of emulations of system-calls operable to run in user space 64 at the end host 14. Additionally, a special send function/send system-call 82 may be included within the set of emulations of system-calls. An application 66 sending traffic onto the datacenter network 10 may utilize the send system-call/function 82 of the library 80 provided by the flow agent 40g. The send system-call/function 82 may proceed to send at least one frame/packet pertaining to a given traffic flow to one or more socket buffers 84a to be sent over an NIC into the datacenter 10. Although the operating system 68 may be configured to interface with a socket buffer 84, the library 80 of the flow agent 40g may make up a socket Application Programming Interface (API), or portion thereof, operable to interface with a socket buffer 84a as well.

Additionally, the send system-call/function 82, within the set of emulations of system-calls, may be operable to copy classification information 86 from an instance of the send system-call. In some examples, a portion of the send system-call/function 82 operable to copy classification information 86 from a call to the system-call/function 82, may be implemented as copy module 76. The classification information 86 may comprise information used to identify the traffic flow and to generate a report 48. By way of example and not limitation, such classification information 86 may include values provided for parameters of the send function 82.

Not by way of limitation, with respect to identifying individual traffic flows, but by way of example, classification information 86 may include a socket name, an associated socket, one or more Internet Protocol (IP) addresses, one or more port numbers, an end-to-end protocol, a domain name, a pointer to a buffer containing data to be transferred and/or the like. Also, by way of example and not limitation, with respect to classifying an individual traffic flow, classification information 86 may include a length of bytes to be transferred. In such examples, including such a specialized send system call 82, therefore, a flow agent 40 may sit transparently under applications 66 to inspect traffic flows sent into the datacenter 60 by those applications 66.

A copy module 76 and/or the send system-call/function 82 may provide the collection information 86 for the classification module 78. The classification module 78 may use the classification information 86 to classify the traffic flow 18 as a long-lived traffic flow where at least one value of the classification information 86 for the traffic flow exceeds a corresponding threshold value. In as much as the classification serves the role of sending the traffic in the first place, it provides information suited for this purpose.

Also depicted at the end host 14s are multiple virtual computing instances/VMs 88a-r supported by the end host. While a flow agent 40 may service a single computing node on a physical end host 14, on end hosts 14 supporting such virtual computing environments, a corresponding flow agent 40g may collect classification information for individual traffic flows from multiple computing instances 88a-r supported thereon. Accordingly, the flow agent 40 may also generate a report 48 on the multiple individual traffic flows and provision the report 48 to the traffic engineering controller 38.

As can be appreciated, the virtualization environment depicted in FIG. 5 is depicted without a hypervisor. In such examples, an approach to supporting a virtualization environment without a hypervisor, such as an Operating-System (OS)-virtualization environment, may be selected. Implementations without a hypervisor may add to gains with respect to speed due to the additional overhead associated with a hypervisor. With respect to additional details and/or different approaches to the use of a flow agent 40 to identify long-lived traffic flows 18, the reader is referred to U.S. Utility patent application Ser. No. 14/222,370, filed on Mar. 3, 2014 and incorporated herein by reference, in which the elephant flows discussed therein are, for the most part, are comparable to the long-lived traffic flows 18 discussed herein. Additional services that may be provided by a flow agent 40 are discussed with respect to the next figure.

Figure 6:
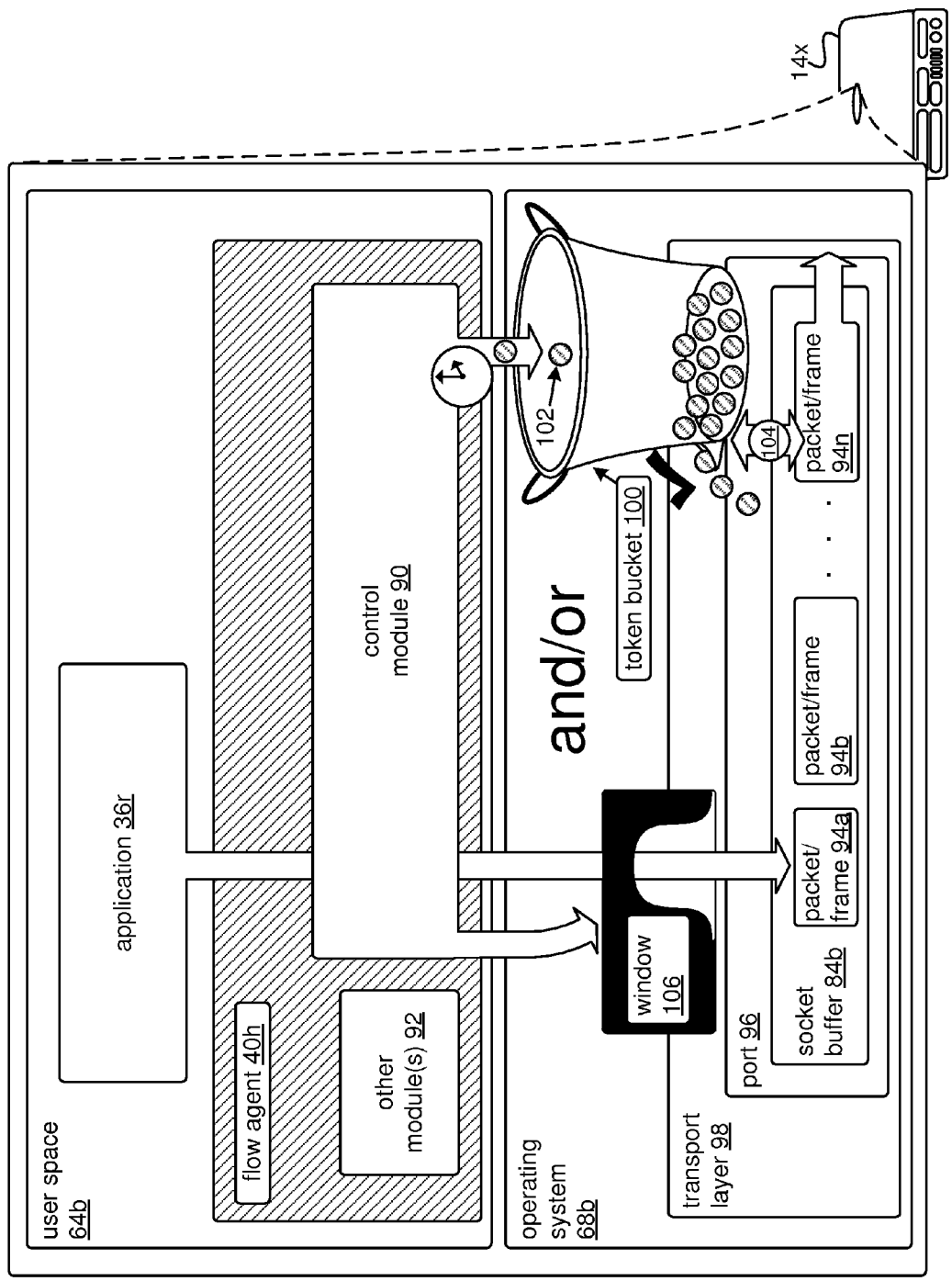
FIG. 6 is a schematic block diagram of potential approaches, by a flow agent, to control a traffic flow from an end host, in accordance with examples; and, FIG. 7 is a flow chart of steps for implementing, by various modules and hardware, different levels of QoS for long-lived traffic flows in a datacenter by identifying long-lived traffic flows at their originating end hosts with flow agents, communicating information about these traffic flows to a globally-aware traffic engineering controller for QoS-based allocations of bandwidth, receiving the allocations back at the flow agents, and controlling send rates, by the agents, for corresponding traffic flows within the allocations, in accordance with examples.

Referring to FIG. 6, a flow agent 40h is depicted residing at the end host 14x. The flow agent 14x may include a control module 90. In some examples one or more other modules 92 may also be present, including those depicted in FIG. 5 and/or additional modules capable of carrying out additional functionalities, whether discussed herein or apparent to one of ordinary skill in the art on the basis of this disclosure.

The control module 90 may be operable to control a rate at which a traffic flow is sent over an NIC such that the traffic flow remains within a bandwidth allocation 42. Thereby, the control module may support a Quality of Service (QoS) for a particular long-lived traffic flow 18 and/or a class of long-lived traffic flows. Conventional approaches to traffic control are directed to changing pathways for traffic flows through changing lookup tables in network devices 12, as is done with the trending technology of OPENFLOW, and/or encapsulating packets/frames with instructions for guiding the packets/frames through a network. Such approaches can require pre-existing configurations, capabilities, networking protocols, and/or the like, to support these approaches within networks.

Controlling the rate of transmission for a long-lived traffic flow 18, however, may be more reliable than simply routing traffic to avoid clogging main arteries. Since in as much as traffic flows stay within their allocations 42, the available bandwidth is not likely to be exceeded. This can particularly be the case where the allocations 42 are made by a central entity, such as a traffic engineering controller 38, with global knowledge of the datacenter 10. For example, where the traffic engineering controller 38 is aware of the long-lived flows 18 that share a bandwidth resource 24 and is aware of the available bandwidth, allocations 42 may be made to directly prevent overtaxing the available bandwidth. Whereas, redirecting traffic flows provides indirect control. As can be appreciated, however, the teachings of the present disclosure may be implemented together with other approaches, such as those discussed above.

The bandwidth allocation 42 for a given, long-lived traffic flow 18 may be communicated to the flow agent 40h over a network. In many examples, this information may be communicated by a traffic engineering controller 38. Such allocations 42 may be provided by the traffic engineering controller 38 to a flow agent 40h in response to an identification of a long-lived traffic flow 18 by the flow agent 80.

By distinguishing between long-lived traffic flows 18 and short-lived traffic flows 20, a course-grained QoS may be implemented based on this distinction/classification. Since short-lived traffic flows 20 can tend to more sensitive to time delay and long-lived traffic flows 18 may introduce long-lived delays, a QoS may be implemented, with a measured aspect of transmission delay, by first routing short-lived traffic flows 20 before long-lived traffic flows 18. For example, short-lived traffic flows 20 may be routed through a higher priority transmission queue. Such systems may be operated with Differentiated Services Code Point (DSCP) configured to provide a higher priority to short-lived traffic flows 20. To respect the sensitivity associated with short-lived traffic flows 20, the flow agent 40h may allow short-lived flows to be transmitted unimpeded over an NIC. More fine-grained QoS may be implemented with the forms of bandwidth allocation and control discussed herein.

Different approaches may be employed by the control module 90 to control the transmission rate of a long-lived traffic flow 18. The examples discussed below are not exhaustive, but are merely provided to assist in the exploration of possibilities. In such a scenario, an application 66r may send packets/frames 94a-r to a socket buffer 84b for a given port 96 for purposes of transmission at the transmission layer 98. For example, a token-bucket approach may be taken, whereby the control module 90 may set a rate at which a token bucket 100 is supplied with tokens 102.

The control module 90 may utilize a traffic/network scheduler provided by an operating system 68b, such as, without limitation, Queuing discipline (Qdisc) for a LINUX operating system, to utilize a token bucket 100 to control a transmission rate calculated to respect the corresponding bandwidth allocation 42. The token bucket 100 may receive tokens 102 at a token rate, indicated by the clock symbol, set by the control module 90. The token rate may indirectly control the transmission rate, since a number of bytes that will be allowed to be sent onto the network is restricted to a number of token 102 available within the token bucket 100, where a predetermined ratio between transmission bytes and tokens 102 is established.

As a packet/frame 94n progresses toward transmission, a check 104 may be made to make sure that there are a sufficient number of tokens 102 in the token bucket 100 to allow the packet/frame 94n to be transmitted. The packets/frames 94a-r may be similar in size, or vary with respect to one another, as depicted. If the answer to the check 104 is yes, as depicted by the check symbol in FIG. 6, the packet/frame 94n is transmitted. If the answer is no, the packet/frame 94n cannot be transmitted until a sufficient number of tokens 102 are added to the token bucket 100 to allow for transmission. Therefore, the control module 90 may be operable to set a token rate for a token bucket 100 assigned to a buffer 84b receiving a traffic flow for transmission. The token rate may be calculated to indirectly prevent the transmission rate of the traffic flow from exceeding the bandwidth allocation 42 for the traffic flow 18.

Another non-limiting approach may involve the utilization of a transport-layer protocol. Although the teachings herein are not limited to Transmission Control Protocol (TCP), in examples that utilize TCP, the control module 90 may set a congestion window 106 to a size calculated to keep a transmission rate for the corresponding long-lived traffic flow 18 within the relevant bandwidth allocation 42. As can be appreciated by those of ordinary skill in the art, alternative approaches may be implemented at the control module 90 to control the transmission rate for a long-lived traffic flow 18.

Figure 7:
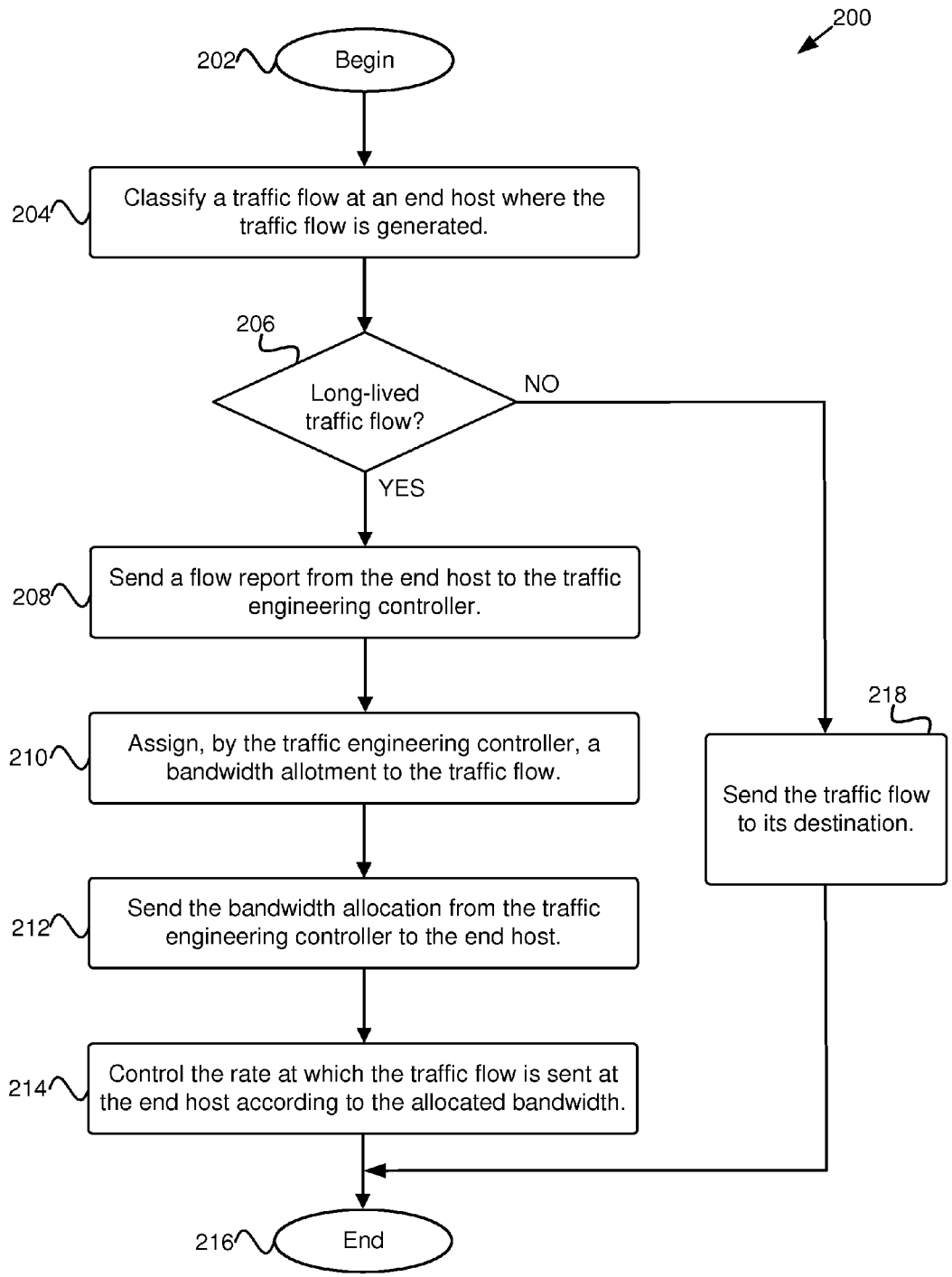

Referring to FIG. 7, methods 200 are depicted for detecting, identifying, and/or classifying traffic flows. The flowcharts in FIG. 7 illustrate the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block-diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block-diagram block or blocks.

It should also be noted that, in some alternative implementations, the functions noted in the blocks may occur out of the order noted in the figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

Referring to FIG. 7, methods 200 consistent with the figure may begin 202 at different points. In some examples, a traffic flow from an end host 14 may be classified 204, by a flow agent 40 at the end host 14 where the traffic flow is generated, as being either a short-lived traffic flow 20 or a long-lived traffic flow 18. As can be appreciated, any of the forgoing discussion about long-lived-traffic-flow identification discussed above with respect to the other figures may be applied during the classification 204 step. A handling determination 206 may then be made as to how to handle a traffic flow based on whether the traffic flow has been classified 204 as a long-lived traffic flow 18 or not. If the answer is YES, and the traffic flow is a long-lived traffic flow 18, the flow agent 40 may generate a flow report 48 and send 208 the report 48 from the end host 14 to a traffic engineering controller 38.

The traffic engineering controller 38 may assign 210 a bandwidth allotment 42 to the long-lived traffic flow 18. The allotment may be based on a QoS pertaining to the long-lasting traffic flow 18. In some examples, the methods 200 may begin with the assignment step 210. As can be appreciated, any of the forgoing discussion about QoS, traffic analysis, traffic engineering, and/or bandwidth allocation, as discussed above with respect to the other figures, may be applied during the assignment step 210. The traffic engineering controller 38 may then send the bandwidth allotment 42 for the long-lived traffic flow 18 to the flow agent 40 at the originating end host 14.

A flow agent 40 at an end host 14 may control the rate at which the traffic flow is sent at the end host 14 according to a bandwidth allocation 42. Some examples may begin at this step. As can be appreciated, any of the forgoing discussion about traffic control and/or keeping a long-lived traffic flow 18 within a bandwidth allocation, as discussed above with respect to the other figures, may be applied during the control step 214. The methods 200 may then end 216. In examples where the answer to the flow-handling determination 206 is NO, the end host 14 may simply send 218 the short-lived traffic flow 20 to its destination, in accordance with any of the principals for short-lived traffic flows 20 discussed herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A system comprising:
a computer having a Central Processing Unit (CPU) and memory and hosting a traffic engineering controller with a global view of multiple long-lived traffic flows comprising:
an interpreter module using reports on the multiple long-lived traffic flows, sent by flow agents at originating end hosts, to acquire a global view of a datacenter by identifying a Quality of Service (QoS), the paths for the multiple long-lived traffic flows across a topology of the datacenter and, to establish bandwidths for bandwidth resources traversed by the paths using a topology description; and
an allocation module that:
calculates, with the global view, a rate at which each of the multiple long-lived traffic flows is transmitted by and from a corresponding flow agent and end host to prevent overtaxing shared bandwidth resources in the datacenter without redirecting the multiple long-lived traffic flows from their paths, and
communicates, from the traffic engineering controller, each of the multiple rates to a corresponding flow agent at a corresponding end host;
uses the global view of the multiple long-lived traffic flows through the datacenter that share the downstream bandwidth resource to assign multiple allocations of bandwidth to the multiple long-lived traffic flows to prevent overtaxing the downstream bandwidth resource; and
communicates the multiple allocations of bandwidth to the multiple flow agents at the multiple end hosts originating the multiple long-lived traffic flows to control the multiple long-lived traffic flows from the multiple end hosts without providing additional information to intermediate nodes for control operations;
wherein the allocation module further applies an augmenting function at least once to improve utilization of available bandwidth in the datacenter, the augmenting function;
checks for available bandwidth for active flow paths traversed by long-lived traffic flows in the datacenter; and
reallocates additional bandwidth from the available bandwidth to a selected long-lived traffic flow according to a priority determined for the selected long-lived traffic flow by the priority module by increasing a corresponding rate communicated to a corresponding flow agent at which the selected long-lived traffic flow is sent from a corresponding end host.

2. The system of claim 1, the traffic engineering controller further comprising:
a priority module that applies a weighting function to the multiple long-lived traffic flows to assign the multiple rates as a function of QoS values identified for multiple individual long-lived traffic flows; and wherein,
the QoS values are identified by the interpreter module.

3. The system of claim 2, wherein a QoS value for a particular long-lived traffic flow is assigned based on a cluster within which the particular long-lived traffic flow is generated.

4. The system of claim 2, wherein the priority module assigns a particular rate to a particular long-lived traffic flow based on a QoS value assigned to the particular long-lived traffic flow relative to a second QoS value for a second long-lived traffic flow that shares a downstream bandwidth resource with the particular long-lived traffic flow along a path of the particular long-lived traffic flow.

5. The system of claim 1, the traffic engineering controller further comprising a topology module within the interpreter module:
maintaining a description of at least one of a topology and an overlay topology of the datacenter; and
reading the paths for the multiple long-lived traffic flows through the datacenter, and wherein;
the allocation module determines the rates for transmitting the multiple long-lived traffic flows that keep the multiple long-lived traffic flows within bandwidth available to be occupied by the multiple long-lived traffic flows at each bandwidth resource along the paths to control the multiple long-lived traffic flows from the originating end hosts as opposed to assigning a control operation to an intermediate network node in the datacenter.

6. A system for providing Quality of Service to traffic flows comprising:
a computer having a Central Processing Unit (CPU), memory, and a Network Interface Controller (NIC) and hosting a traffic engineering controller executable by the CPU having a global view, provided by the multiple flow agents at multiple end hosts, of multiple long-lived traffic flows in a datacenter and further comprising:
an interpreter module that receives a report on a long-lived traffic flow identified by a flow agent at an end host, sent from the end host over a network of the datacenter serviced by the traffic engineering controller, and identify the Quality of Service (QoS) from the report; and
an allocation module that:
assigns an allocation of bandwidth to the long-lived traffic flow that controls a rate at which the long-lived traffic flow is transmitted at the end host, supports the QoS, and reduced bandwidth occupied by the long-term traffic flow at a downstream bandwidth resource shared with a second long-lived traffic flow,
communicates the allocation of bandwidth to the flow agent to control, from the end host, bandwidth occupied by the long-lived traffic flow, along a path traversed by the long-lived traffic flow, by the flow agent controlling the rate at which the long-lived traffic flow is sent,
uses the global view of the multiple long-lived traffic flows through the datacenter that share the downstream bandwidth resource to assign multiple allocations of bandwidth to the multiple long-lived traffic flows to prevent overtaxing g the downstream bandwidth resource; and communicates the multiple allocations of bandwidth to the multiple flow agents at the multiple end hosts originating the multiple long-lived traffic flows to control the multiple long-lived traffic flows from the multiple end hosts without providing additional information to intermediate nodes for control operations;

wherein the allocation module further applies an augmenting function at least once to improve utilization of available bandwidth in the datacenter, the augmenting function;

checks for available bandwidth for active flow paths traversed by long-lived traffic flows in the datacenter; and reallocates additional bandwidth from the available bandwidth to a selected long-lived traffic flow according to a priority determined for the selected long-lived traffic flow by the priority module by increasing a corresponding allocation of bandwidth communicated to a corresponding flow agent and controlling an increased rate at which the selected long-lived traffic flow is sent from a corresponding end host.

7. A system comprising:

a computer having a Central Processing Unit (CPU), memory, and hosting a traffic engineering controller with a global view of multiple long-lived traffic flows comprising:

an interpreter module using reports on the multiple long-lived traffic flows, sent by flow agents at originating end hosts, to acquire a global view of a datacenter by identifying the Quality of Service (QoS), the paths for the multiple long-lived traffic flows across a topology of the datacenter, and to establish bandwidths for bandwidth resources traversed by the paths using a topology description; and an allocation module that:

calculates, with the global viewer, a rate at which each of the multiple long-lived traffic flows is transmitted by and from a corresponding flow agent and end host to prevent overtaxing shared bandwidth resources in the datacenter without redirecting the multiple long-lived traffic flows from their paths, and communicates, from the traffic engineering controller, each of the multiple rates to a corresponding flow agent at a corresponding end host;

uses the global view of the multiple long-lived traffic flows through the datacenter that share the downstream bandwidth resource to assign multiple allocations of bandwidth to the multiple long-lived traffic flows to prevent overtaxing the downstream bandwidth resource; and communicates the multiple allocations of bandwidth to the multiple flow agents at the multiple from the multiple end hosts without providing additional information to intermediate nodes for control operations;

wherein:

the traffic engineering controller further comprising a topology module within the interpreter module that;

maintains a description of at least one of a topology and an overlay topology of the datacenter; and reads the paths for the multiple long-lived traffic flows through the datacenter;

wherein the allocation module determines the rates for transmitting the multiple long-lived traffic flows that keep the multiple long-lived traffic flows within bandwidth available to be occupied by the multiple long-lived traffic flows at each bandwidth resource along the paths to control the multiple long-lived traffic flows from the originating end hosts as opposed to assigning a control operation to an intermediate network node in the datacenter;

the topology module further determines an available bandwidth for downstream bandwidth resources in the datacenter; and the allocation module further distributes multiple rates to the multiple flow agents, at the originating end hosts, mapped to concurrently pass through the downstream bandwidth resources by the topology module, the multiple rates derived by a QoS-based weighting function.

8. The system of claim 7, wherein the allocation module assigns the available bandwidth in full and to each long-lived traffic flow of the multiple long-lived traffic flows at least a portion of the available bandwidth, such that no long-lived traffic flow stagnates.

9. A system supporting a Quality of Service (QoS), comprising:

multiple end hosts in a datacenter, each of the multiple end hosts having a Central Processing Unit, memory, and a Network Interface Controller;

a traffic engineering controller with a global view, servicing the datacenter and hosted by a computer and comprising:

an aggregation module collects reports on multiple traffic flows from multiple end hosts;

a path module determines fixed paths for the multiple traffic flows across a topology of the datacenter;

an availability module establishes available bandwidths for bandwidth resources in the datacenter; and an allocation module assigns rates at which the multiple traffic flows are sent from the multiple end hosts to prevent the multiple traffic flows across the datacenter from overtaxing bandwidth resources shared by the multiple traffic flows while assigning differing rates to individual traffic flows from the multiple traffic flows as a function of corresponding QoS values individually to the multiple traffic flows;

uses the global view of the multiple traffic flows through the datacenter that share the downstream bandwidth resource to assign multiple allocations of bandwidth to the multiple traffic flows to prevent overtaxing the downstream bandwidth resource; and communicates the multiple allocations of bandwidth to the multiple flow agents at the multiple end hosts originating the multiple traffic flows to control the multiple traffic flows from the multiple end hosts without providing additional information to intermediate nodes for control operations; and multiple flow agents, each flow agent of the multiple flow agents runs within user space at an end host of the multiple end hosts, receive the rates assigned by the allocation module, and control transmission of the multiple traffic flows from the multiple end hosts at the rates corresponding to the multiple traffic flows, while maintaining the fixed paths of the multiple traffic flows unaltered;

wherein the allocation module further applies an augmenting function to maintain high utilization of available bandwidth, the augmenting function:

checks for available bandwidth based on multiple reports from the aggregation module, the fixed paths determined by the path module, and the available bandwidths established by the availability module; and reallocates additional bandwidths from the available bandwidths for the bandwidth resources along the fixed paths of the multiple traffic flows according to the QoS values by increasing the rates communicated to the multiple flow agents residing on corresponding end hosts at which the corresponding traffic flows originate.

10. The system of claim 9, each flow agent of the multiple flow agents further comprising:

a monitoring module with a send function sends at least one packet pertaining to a corresponding traffic flow, generated with a call to the send function, from a socket at a corresponding end host;

a copy module comprising a portion of the send function and copies classification information from the call to the send function;

a classification module classifies the corresponding traffic flow as a long-lived traffic flow where at least one value of the classification information for the corresponding traffic flow exceeds a corresponding threshold value; and a report module generates a report, from the classification information, on the corresponding traffic flow and to provision the report to the traffic engineering controller.

11. The system of claim 9, wherein the allocation module of the traffic engineering controller:

fully allocates bandwidth resources in the datacenter among the multiple traffic flows;

prevents each traffic flow of the multiple traffic flows from stagnating; and wherein, each of the QoS values represents at least one of:
  a virtual cluster in which a corresponding, individual traffic flow is generated, and
  a QoS value assigned to a job responsible for generating the corresponding, individual traffic flow.

* * * * *

UNITED STATES PATENT AND TRADEMARK OFFICE
CERTIFICATE OF CORRECTION

PATENT NO. : 9,882,832 B2
APPLICATION NO. : 14/454684
DATED : January 30, 2018
INVENTOR(S) : Rafit Izhak-Ratzin et al.

It is certified that error appears in the above-identified patent and that said Letters Patent is hereby corrected as shown below:

In the Claims

Column 21 Claim 7, Lines 54-57 read:
"communicates the multiple allocations of bandwidth to the multiple flow agents at the multiple from the multiple end hosts without providing additional information to intermediate nodes for control operations;"
Should read:
--communicates the multiple allocations of bandwidth to the multiple flow agents at the multiple end hosts originating the multiple long-lived traffic flows to control the multiple long-lived traffic flows from the multiple end hosts without providing additional information to intermediate nodes for control operations;--

Signed and Sealed this
Thirteenth Day of November, 2018

Andrei Iancu
*Director of the United States Patent and Trademark Office*